United States Patent [19]

Hicks et al.

[11] Patent Number: 4,911,525
[45] Date of Patent: Mar. 27, 1990

[54] OPTICAL COMMUNICATION CABLE

[76] Inventors: John W. Hicks, 312 Howard St., Northboro, Mass. 01532; Charles H. Olmstead, 111 Country Club Blvd., Worcester, Mass. 01605

[21] Appl. No.: 253,711
[22] Filed: Oct. 5, 1988
[51] Int. Cl.⁴ .............................................. G02B 6/44
[52] U.S. Cl. ................................................ 350/96.23
[58] Field of Search .......................... 350/96.10, 96.23

[56] References Cited

U.S. PATENT DOCUMENTS

| 4,138,193 | 2/1979 | Olszewski et al. | 350/96.23 |
|---|---|---|---|
| 4,307,386 | 12/1981 | Bridge | 350/96.23 |
| 4,367,460 | 1/1983 | Hodara | 350/96.10 |
| 4,461,650 | 7/1984 | Franken | 350/96.23 |
| 4,468,089 | 8/1984 | Brorein | 350/96.23 |
| 4,521,767 | 6/1985 | Bridge | 350/96.23 |
| 4,541,686 | 9/1985 | Barfuss et al. | 350/96.23 |
| 4,684,214 | 8/1987 | Goldmann et al. | 350/96.23 |
| 4,783,138 | 11/1988 | Oestreich | 350/96.23 |
| 4,801,764 | 1/1989 | Ohlhaber | 350/96.23 |

Primary Examiner—William L. Sikes
Assistant Examiner—Robert E. Wise
Attorney, Agent, or Firm—Wolf, Greenfield & Sacks

[57] ABSTRACT

An optical communication cable includes an elongated flexible strip or tape, one or more optical fibers affixed to the tape, and an adhesive on a surface of the tape. The optical cable is utilized for interconnecting points within a building by applying the adhesive to an interior wall, ceiling, floor or partition. When a transparent tape is utilized, the optical cable is nearly invisible on a wall. The cable can include protective stands that run parallel to the optical fibers. Various fixtures are provided for interconnecting and installing the optical cable. Applicator tools for installing the optical cable on a surface are disclosed.

26 Claims, 4 Drawing Sheets

OPTICAL COMMUNICATION CABLE

FIELD OF THE INVENTION

This invention relates to fiber optic communication cables and, more particularly, to surface-mounted fiber optic cables intended primarily for indoor use.

FIELD OF THE INVENTION

Fiber optic communication cables have gained widespread use in long distance applications because of their wide bandwidth, small size and insensitivity to electrical interference. When the optical fiber cables are run long distances, they are installed in a manner similar to electrical cables in protective jackets or conduits, usually on utility poles or underground. When optical fiber cables are installed in buildings, they are usually encased in protective jackets and are routed through conduits and cable trays using the same techniques that are employed for electrical cables. Such installation procedures are utilized despite the fact that optical fibers are extremely small in diameter and do not carry hazardous electrical potentials.

Use of optical fiber cables in local area networks for telecommunications, computer network interconnection and the like is increasing. It is desirable to provide an optical fiber cable that is easy to install in buildings and is low in cost. These factors are particularly important when optical cable is being installed after completion of the building. In the past it has been customary to install optical cables in walls and between floors at high expense.

A flat fiber optic cable is disclosed in U.S. Pat. No. 4,496,215 (Shaheen et al). Fiber optic filaments are embedded in a resin layer between first and second surface layers. The disclosed fiber optic cable is intended primarily for coupling signal paths between modules and subassemblies within electronic assemblies.

It is a general object of the present invention to provide improved fiber optic cables.

It is another object of the present invention to provide fiber optic cables tat can be surface mounted on walls, ceilings, partitions and the like.

It is another object of the present invention to provide surface-mounted fiber optic cables that are resistant to mechanical damage.

It is still another object of the present invention to provide surface-mounted fiber optic cables that are virtually invisible when installed.

It is a further object of the present invention to provide fiber optical cables that are suitable for interconnecting different locations within buildings.

It is a further object of the present invention to provide a simple, low cost method of installing fiber optic cable.

It is a further object of the invention to provide tools for applying an optical cable to a surface.

SUMMARY OF THE INVENTION

According to the present invention, these and other objects and advantages are achieved in an optical cable comprising an elongated flexible strip, at least one optical fiber affixed to the flexible strip and an adhesive on a surface of the flexible strip. The optical cable is utilized for interconnecting points within a building by applying the adhesive to an interior wall, ceiling, floor or partition of the building. Preferably, the optical cable is installed on a wall just below the intersection with the ceiling so that damage is unlikely and the cable is relatively unobtrusive.

Preferably, the flexible strip is a substantially transparent tape having a low specular reflection. The optical fiber is on the order of 30-60 micrometers in diameter. As a result, the optical cable is practically invisible when it is installed on a wall or other surface.

According to one feature of the invention, the optical cable can include at least one protective strand of glass fiber, wire, polymer filament or the like affixed to the flexible strip parallel to the optical fiber. In a preferred embodiment, a pair of protective strands is embedded in the flexible strip on opposite sides of, and parallel to, the optical fiber. Each protective strand has a diameter that is slightly larger than the optical fiber. In a preferred embodiment, the optical fiber and the protective strands are sealed between two flexible strips, and the adhesive is applied to one of the outside surfaces. A removable film preferably covers the adhesive until the time of installation so that the optical cable can be rolled for storage and handling.

An optical interconnection system in accordance with the invention includes an interconnection means attached to opposite ends of each optical fiber for coupling the optical cable to transmitting and/or receiving equipment or to another optical cable. The interconnection means can comprise a graded index lens coupled to the optical fiber. A connector block supports and aligns the graded index lens of each optical cable. The interconnection system can further include curvature-limiting devices for limiting the radius of curvature of the optical fiber at corners or at right angle bends in the plane of the cable.

According to another aspect of the invention, there is provided a method for interconnecting a first location and a second location within a building with an optical fiber comprising the steps of providing an optical cable including an elongated flexible strip, at least one optical fiber affixed to the flexible strip and an adhesive on a surface of the flexible strip, and attaching the optical cable to one or more walls of the building between the first location and the second location by applying the adhesive of the flexible strip to one or more of the walls.

According to yet another aspect of the invention, there is provided a toll for applying the optical cable to a surface. In one embodiment, the tool stores a complete optical cable having a removable film on a reel. In another embodiment, one or more optical fibers, a flexible strip and adhesive are applied to the surface to form an optical cable in place.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
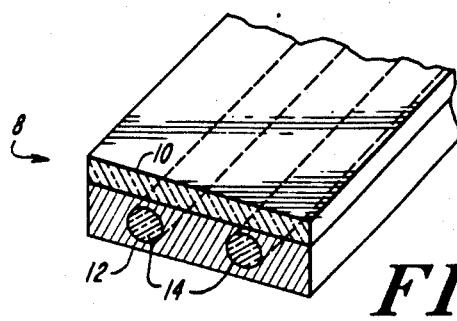
FIG. 1 is an enlarged, cross sectional view of an optical cable in accordance with the present invention.

An optical cable 8 in accordance with one embodiment of the invention is shown in FIG. 1. An enlarged cross-sectional view of the optical cable 8 is shown. An elongated flexible strip 10 has an adhesive 12 on one surface. One or more optical fibers 14 are affixed to the flexible strip 10 on the same side as adhesive 12. In the embodiment of FIG. 1, the optical fibers 14 are held in place by the adhesive 12. The optical fibers 14 are parallel to each other and run lengthwise along flexible strip 10.

The flexible strip 10 is preferably a transparent tape having low specular reflection. In an alternative embodiment, the flexible strip 10 can be made in various colors and designs to match existing wall coverings. A preferred material for flexible strip 10 is polyester. Any suitable long-life adhesive, such as a rubber based adhesive, can be utilized. The optical fibers 14 preferably have a diameter in the range from about 30 to 60 micrometers.

The optical cable 8 shown in FIG. 1 is installed by applying he flexible adhesive strip to interior walls between the locations to be interconnected. Since the strip 10 is transparent and optical fibers 14 are extremely small in diameter, the optical cable is practically invisible when it is installed on a wall. Preferably, the cable 8 is installed on the wall just below the intersection with the ceiling to prevent damage by children, furniture, etc. The cable 8 can also be installed on ceilings, floors, partitions and other interior surfaces, as necessary.

Figure 2:
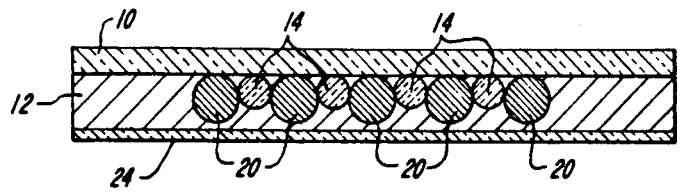
FIG. 2 is an enlarged, cross-sectional view of another embodiment of an optical cable in accordance with the present invention.

An optical cable in accordance with another embodiment of the invention is illustrated in FIG. 2. Optical fibers 14 are affixed to flexible strip 10 by adhesive 12, and protective strands 20 are located on opposite sides of each optical fiber 14. The protective strands 20 run parallel to fibers 14, are flexible and are mechanically more durable than optical fibers 14. Preferably, the protective strands 20 are larger in diameter than optical fibers 14. Protective strands 20 can be glass fibers, wires, polymer filaments or the like. An impact on the optical cable will, in most cases, be absorbed by the protective strands 20 so that damage to the optical fiber 14 is avoided. It will be understood that any number of optical fibers 14 and protective strands 20 can be utilized in the optical cable. A temporary, easily removable film 24, such as cellophane, preferably covers adhesive 12 until the optical cable is ready for installation. The film 24 permits the optical cable to be rolled for storage and handling prior to installation.

Figure 3:
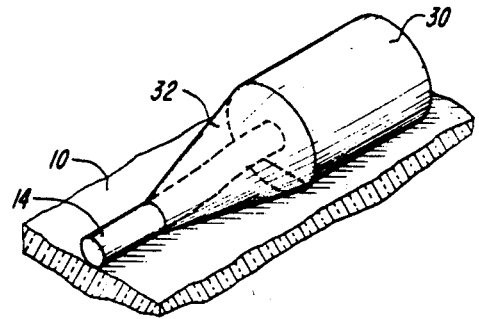
FIG. 3 illustrates a graded index lens attached to one end of the optical cable.
Figure 4:
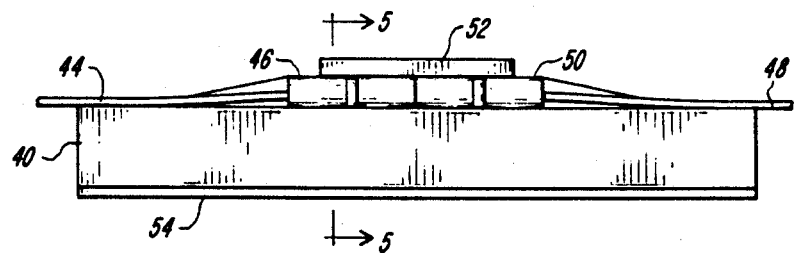
FIG. 4 is an enlarged, elevation view of an arrangement for interconnecting two optical cables.
Figure 5:
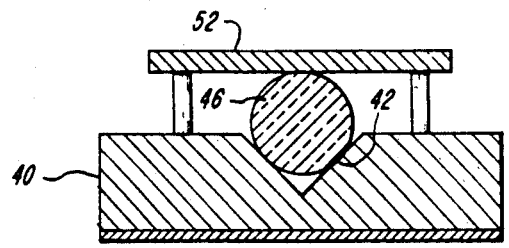
FIG. 5 is an enlarged, cross-sectional view of the interconnection arrangement taken through the line 5—5 of FIG. 4.

The optical cable of the present invention can be utilized in an optical interconnection system in which it is interconnected to other optical cables or to optical receiving and/or transmitting equipment by means of conventional optical fiber connectors. A preferred interconnection arrangement is illustrated in FIGS. 3–5. A graded index lens 30 is attached to the end of optical fiber 14 so that its optical axis is aligned with optical fiber 14. A bonding material 32, such as epoxy cement, is used to secure the optical fiber 14 to the graded index lens 30. The bonding material 32 can also be applied to flexible strip 10 in the region of the interconnection for mechanical strength. A suitable graded index lens 00 is a type known as Sel-Foc.

An arrangement for interconnecting two optical cables is illustrated in FIGS. 4 and 5. An alignment block, or connector block 40, is provided with a V-shaped groove 42 in its top surface. An optical cable 44 is terminated in a graded index lens 46, and an optical cable 48 is terminated in a graded index lens 50, as shown in FIG. 3 and described above. The lenses 46 and 50 are placed in the V-groove 42 with their ends abutting each other. A hold-down clamp 52, which can be spring-loaded, secures lenses 46 and 50 in position on connector block 40. The hold down clamp 52 can have any configuration suitable for holding the lenses 46 and 50 in fixed positions relative to each other. The V-groove 42 insures alignment between the optical axes of lenses 46 and 50.

The connector block 40 can be provided with an adhesive 54 for convenient installation. To further facilitate installation, the optical scales of the present invention can be provided in a variety of different lengths with graded index lenses installed at each end.

Figure 6:
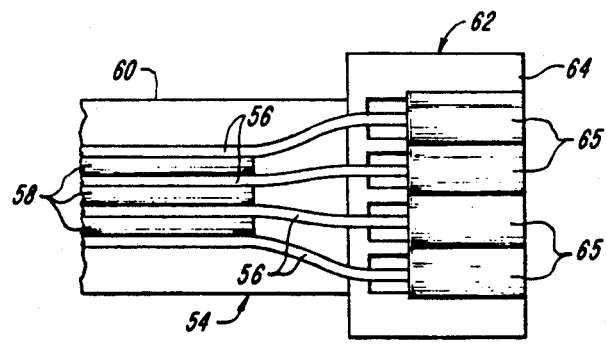
FIG. 6 is an elevation view of a connector for interconnecting optical cables having multiple optical fibers.

A connector suitable for interconnection of optical cables having multiple optical fibers is illustrated in FIG. 6. An optical cable 54, having multiple optical fibers 56 and multiple protective strands 58 mounted on a tape 60, is terminated in a connector 62. The connector 62 includes a lens fixture 64 having V-grooves for mounting of lenses 65 in parallel alignment. The fibers 56 are coupled to the lenses 65, as described above, and the protective fibers 58 are cut back.

Figure 7:
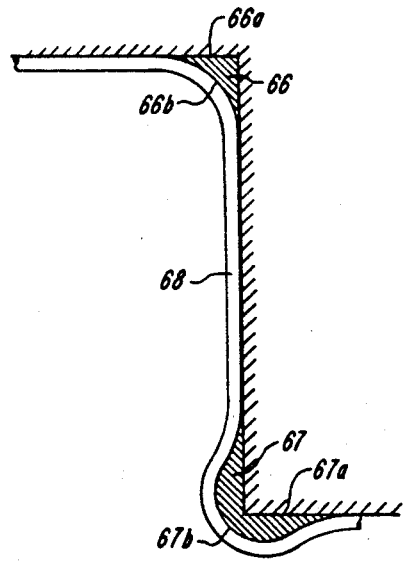
FIG. 7 is a schematic diagram illustrating the use of curvature-limiting devices at corners.

A further feature of the optical interconnection system is illustrated n FIG. 7. It is known that optical fibers are subject to microbending losses and possible breakage at sharp bends or corners. To avoid such losses and to prevent breakage, curvature-limiting devices can be utilized at points where the cable is routed around a corner. As shown in FIG. 7, an inside curvature limiting device 66 is utilized for inside corners, and an outside curvature-limiting device 67 is used for outside corners. The curvature limiting devices 66 and 67 can have any convenient construction, but most conveniently are molded. The inside surface 66a, 67a of each curvature limiting device 66, 67 that contacts the corner is formed as a right angle and preferably includes an adhesive for installation to the corner. The outside surface 66b, 67b is formed with a curvature having a radius of 1 centimeter or greater. Thus, when an optical cable 68 is routed around corners, the bending radius of the cable is established by the curvature-limiting device, and microbending losses and breakage are avoided.

Figure 8:
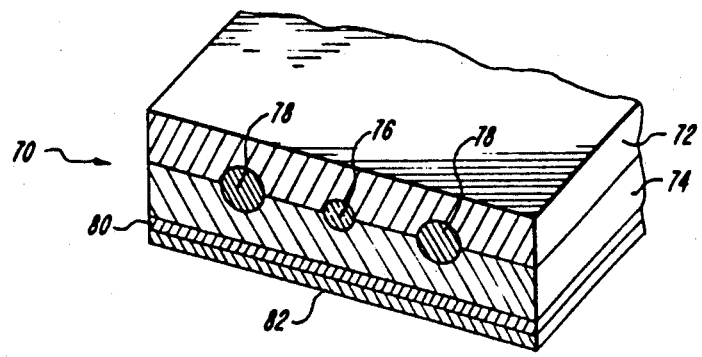
FIG. 8 is an enlarged, cross-sectional view of a preferred optical cable in accordance with the present invention.

A preferred embodiment of the optical cable is illustrated in FIG. 8. A flexible strip 70 includes a first flexible layer 72 and a second flexible layer 74. At least one optical fiber 76 is sealed between layers 72 and 74. Optional protective strands 78 can also be sealed between layers 72 and 74. An adhesive layer 80 is applied to one surface of flexible strip 70. In this embodiment, the adhesive 80 is not used for affixing the optical fiber 76 to the flexible strip 70. A temporary, easily removable film 82 covers adhesive 80 until the optical cable is ready for installation. The layers 72 and 74 are preferably polyester. The optical fiber 76 and protective strands 78 are heated and drawn between the layers 72 and 74. When the layers 72 and 74 ar brought into contact, the heated optical fiber 76 and strands 78 cause the layers 72, 74 to be heated and deformed so that an effective seal is formed between the layers 72 and 74.

Figure 9:
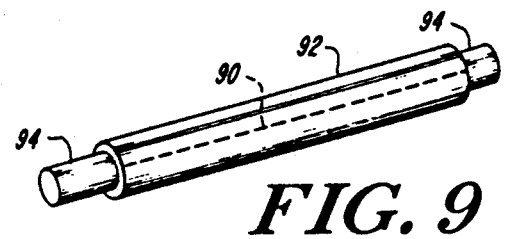
FIG. 9 is a perspective view of a cable section used for passing through walls.

The optical cable described above is intended primarily for installation on wall surfaces. However, it is frequently necessary for the optical cable to pass through walls. In this case, the optical cable described above is not suitable. A cable section suitable for interconnection through walls is shown in FIG. 9. A length of optical fiber 90 is installed in a protective outer jacket 92 such as polyvinylchloride. Preferably, the outer jacket 92 is flexible to permit bending. The optical fiber 90 is terminated at each end in a graded index lens 94 which extends beyond the end of jacket 92. The lenses 94 are connected to the ends of optical cables constructed as described hereinabove to complete interconnection between points in the building. The assembly shown in FIG. 9 can be constructed in various lengths for various applications.

Figure 10:
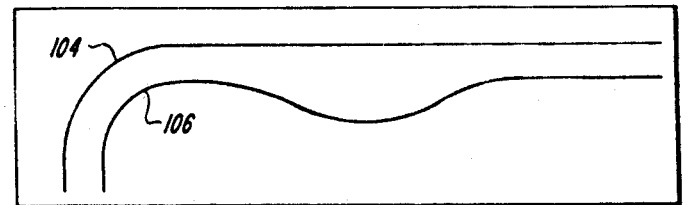
FIG. 10 illustrates a fixture for accommodating a right angle bend in the plane of the optical cable.

Another component of the optical interconnection system is shown in FIG. 10. In some cases, it is necessary for the optical cable of the present invention to be installed with a right angle bend in the plane of the cable. A cable that is more or less flat cannot make a right angle bend in its plane without lifting of the cable from the surface, since the inside of the bend is shorter than the outside of the bend. A right angle fixture 102 is shown in FIG. 10. At the region of a right angle bend, the optical fibers in the cable are separated from the tape and installed in grooves in fixture 102. A first groove 104 accommodates he fiber at the outside of the right angle bend, and a groove 106 accommodates the fiber at the inside of the bend. Additional grooves can be provided when additional fibers are present in the cable, and grooves can be provided for protective strands. The outside groove 104 follows a gently curving 90° bend. Groove 106 follows a serpentine, gently curving path that is equal in length to groove 104. Thus, the optical fibers in the cable can all lay flat against the wall around a right angle bend.

In some cases, it may be necessary for an optical cable in accordance with the present invention to split into two or more similar optical cables. A beam splitter utilizing a 50% reflective mirror oriented at 45° with respect to the optical fibers can be utilized for splitting optical signals from one cable to two cables.

Figure 11:
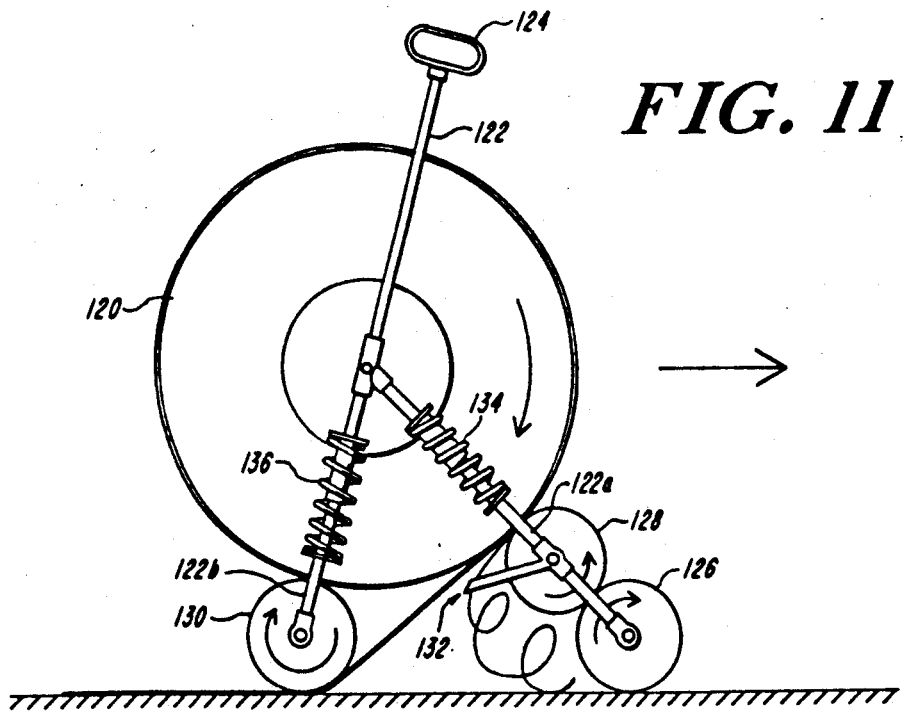
FIG. 11 is a schematic diagram of a tool for installing a composite optical cable having a removable film.

A schematic diagram of a manually-operable applicator tool for installing optical cables wherein the adhesive is protected by a removable film is shown in FIG. 11. A reel 120 is rotatably mounted to a frame 122 having a handle 124. The optical cable to be installed, with the adhesive covered by a removable film, is rolled onto the reel 120. A drive wheel 126 and an idler wheel 128 are rotatably mounted to a first leg 122a of frame 122. The drive wheel 126, the idler wheel 128 and the reel 120 are in frictional contact at their edges and rotate together. A pressure roller 130 is rotatably mounted to a second leg 122b of frame 122. A stripper 132 coupled to the first leg 122a strips the removable film from the optical cable as the cable is unrolled from reel 120.

In operation, the optical cable is rolled onto reel 120, and the applicator tool is brought into contact with the wall or other surface on which the cable is to be installed. The drive wheel 126 is caused by friction with the surface to rotate as the tool is moved. The idler wheel 128, preferably of the same diameter as drive wheel 126, transmits the rotation of the drive wheel 126 to the reel 120. As a result, the optical fiber is delivered to the surface without stress or strain. As the optical cable is unrolled, the outside diameter of reel 120 decreases. A spring 134 maintains constant pressure between reel 120 and idler wheel 128 as the diameter of reel 120 decreases. The pressure roller 130 is provided with a deformable surface, such as rubber, and forces the optical cable including the tape, optical fibers, protective strands and adhesive against the surface to insure a secure bond. A spring 136 maintains a constant force between the pressure roller 130 and the surface as the applicator tool is moved. The stripper 132 strips away the removable film as the optical cable is unrolled.

In cases where an optical cable must be installed behind an obstruction or through a hole that is not large enough to accommodate passage of the applicator, the optical cable is unwound from the reel 120, and the free end is threaded through the obstruction or hole and then remounted on the reel 120 so that installation may continue.

Figure 12:
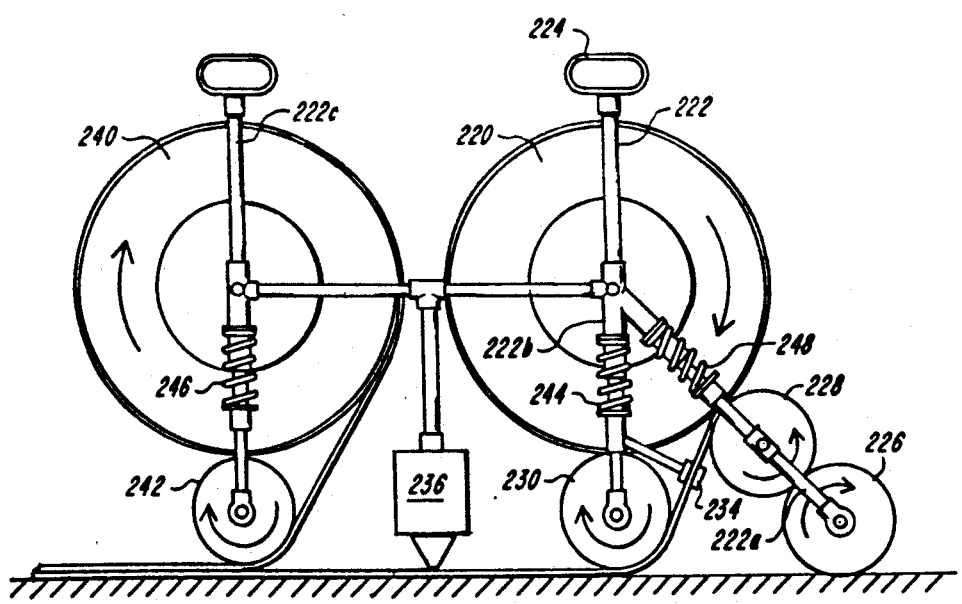
FIG. 12 is a schematic diagram of a tool for installing separate optical fibers, protective strands, adhesive, and protective tape.

An applicator tool suitable for installation of optical fibers that have not previously been affixed to a flexible strip by an adhesive is shown in schematic forming FIG. 12. A reel 220 is rotatably mounted to a frame 222 having a handle 224. A drive wheel 226 and an idler wheel 228 are rotatably mounted to a first leg 222a of frame 222. The drive wheel 226, the idler wheel 228 and the reel 220 are in frictional contact at their edges and rotate together. A pressure roller 230 is rotatably mounted to a second leg 222b of frame 222. In the embodiment of FIG. 12, each optical fiber and each protective strand of the optical cable are mounted on separate reels or on separate sections of one reel 220. The optical fibers and the protective strands are aligned and spaced as they are removed from the reel 220 by a positioning mechanism 234 attached to frame 222.

Also attached to frame 222 is an adhesive dispenser 236. The adhesive dispenser 236 is positioned adjacent to the pressure roller 230 so as to dispense adhesive over the optical fibers and protective strands that have been rolled onto the surface. A reel 240 and a pressure roller 242 are rotatably mounted to a third leg 222c of frame 222. The flexible strip or tape for the optical cable is rolled onto reel 240. The reel 240 and pressure roller 242 are positioned adjacent to adhesive dispenser 236 so as to unroll the tape over the optical fibers, protective strands and adhesive that have been applied to the surface. The pressures between each of the rollers 230 and 242 and the surface on which the cable is being installed are controlled by springs 244 and 246, respectively. The reel 220 is maintained in contact with idler wheel 228 by a spring 248. The reel 220, the adhesive dispenser 236 and the reel 240 define first, second and third stages, respectively, of the applicator tool.

In operation, the optical fibers and protective strands are unwound from the reel 220 in the first stage by the action of drive wheel 226 and idler wheel 228. The optical fibers and protective strands are aligned and positioned by the positioning mechanism 234, and the pressure roller 230, having a deformable surface such as rubber, holds the fibers and protective strands in position on the surface. Then, adhesive is applied to the optical fibers, the protective strands and the surface by the adhesive dispenser 236 in the second stage. The width of the adhesive stripe is the same or slightly less than the width of the protective tape. At the third stage, the protective tape is unrolled and is positioned over the adhesive. The pressure roller 242, also having a deformable surface, forces the protective tape against the underlying materials and causes the adhesive to flow around and underneath the optical fibers and the protective strands.

The optical cable disclosed herein is low in cost and is extremely simple to install. When a transparent flexible strip is used, the installed cable is essentially invisible. The optical cable can be placed at a location high on a wall to minimize the possibility of damage.

While there has been shown and described what is at present considered the preferred embodiments of the present invention, it will be obvious to those skilled in the art that various changes and modifications may be made therein without departing from the scope of the invention as defined by the appended claims.

What is claimed is:

1. An optical cable comprising:
   an elongated flexible strip;
   at least one optical fiber affixed to said flexible strip;
   an adhesive on a surface of said flexible strip; and
   a removable film covering said adhesive prior to installation.

2. An optical cable comprising:
   an elongated flexible strip;
   at least one optical fiber affixed to said flexible strip; and
   an adhesive on a surface of said flexible strip, wherein said flexible strip is substantially transparent.

3. An optical cable comprising:
   an elongated flexible strip;
   at least one optical fiber affixed to said flexible strip; and
   an adhesive on a surface of said flexible strip, wherein said flexible strip is a material that is substantially invisible when firmly attached to a surface.

4. An optical cable comprising:
   an elongated flexible strip;
   at least one optical fiber affixed to said flexible strip;
   an adhesive on a surface of said flexible strip; and
   at least one protective strand affixed to said flexible strip parallel to said optical fiber.

5. An optical cable comprising:
   an elongated flexible strip;
   at least one optical fiber affixed to said flexible strip;
   an adhesive on a surface of said flexible strip; and
   a pair of protective strands embedded in said flexible strip on opposite sides of and parallel to said optical fiber.

6. An optical cable as defined in claim 5 wherein said protective strands are larger in diameter than said optical fiber.

7. An optical cable comprising:
   an elongated flexible strip;
   at least one optical fiber affixed to said flexible strip; and
   an adhesive on a surface of said flexible strip, wherein said flexible strip includes a first layer and a second layer and wherein said optical fiber is sealed between said first layer and said second layer.

8. An optical cable comprising:
   an elongated flexible strip;
   at least one optical fiber affixed to said flexible strip; and
   an adhesive on a surface of said flexible strip, wherein said optical fiber has a diameter in the range of 30 micrometers to 60 micrometers.

9. An optical cable comprising:
   an elongated flexible strip;
   at least one optical fiber affixed to said flexible strip; and
   an adhesive on a surface of said flexible strip, wherein said optical fiber is embedded in said flexible strip.

10. An optical cable as defined in one of claims 2–9 further including a removable film covering said adhesive prior to installation.

11. An optical cable comprising:
    an elongated flexible strip;
    at least one optical fiber affixed to said flexible strip;
    an adhesive on a surface of said flexible strip; and
    interconnection means attached to at least one end of said optical fiber.

12. An optical cable as defined in claim 11 wherein said interconnection means includes a graded index lens connected to one end of said optical fiber.

13. An optical interconnection system for interconnecting a first location and second location within a building, comprising:
    an optical cable comprising an elongated flexible strip, at least one optical fiber affixed to said flexible strip and an adhesive on a surface of said flexible strip; and
    interconnection means attached to opposite ends of said optical fiber for coupling said optical cable to equipment or to another optical cable, wherein each interconnection means comprises a graded index lens connected to one end of said at least one optical fiber.

14. An optical interconnection system as defined in claim 13 further including a connector block for supporting said graded index lens and the end of said at least one optical fiber coupled thereto.

15. An optical interconnection system for interconnecting a first location and second location within a building, comprising:
    an optical cable comprising an elongated flexible strip, at least one optical fiber affixed to said flexible strip and an adhesive on a surface of said flexible strip;
    interconnection means attached to opposite ends of said optical fiber for coupling said optical cable to equipment or to another optical cable; and
    curvature limiting means for limiting the radius of curvature of said at least one optical fiber at bends in said optical cable.

16. An optical interconnection system as defined in claim 15 wherein said curvature-limiting means includes a fitting for limiting the curvature of said optical fiber at an outside corner.

17. An optical interconnection system as defined in claim 15 wherein said curvature-limiting means includes a fitting for limiting the curvature of said optical fiber at an inside corner.

18. An optical interconnection system as defined in claim 15 wherein said curvature-limiting means includes a fitting for limiting the curvature of said optical fiber at a bend in the plane of said optical cable.

19. A method for interconnecting a first location and a second location within a building with an optical fiber comprising the steps of:
providing an optical cable including an elongated flexible strip, at least one optical fiber affixed to said flexible strip and an adhesive on a surface of said flexible strip; and
attaching said optical cable to one or more walls of said building between said first location and said second location by applying the adhesive of said flexible strip to said one or more walls.

20. A tool for applying to a surface an optical cable having a removable film, comprising:
a reel for holding a rolled length of optical cable;
means for unrolling said optical cable from said reel as said tool is advanced along the surface;
means for pressing said optical cable against the surface as it is unrolled from said reel; and
means for stripping said removable film from said optical cable as it is unrolled from said reel.

21. A tool as defined in claim 20 wherein said unrolling means comprises a drive wheel which rolls on said surface and an idler wheel in edge contact with said drive wheel and said reel.

22. A tool as defined in claim 21 wherein said pressing means comprises a pressure roller.

23. A tool for applying at least one optical fiber, a flexible strip and an adhesive to a surface to form an optical cable on the surface, comprising:
first reel means for holding a rolled length of at least one optical fiber;
means for unrolling said at least one optical fiber from said first reel means as said tool is advanced along the surface;
second reel means for holding a rolled length of flexible strip, said second reel means being positioned to unroll the flexible strip over the optical fiber; and
means for applying an adhesive between the flexible strip and the surface such that the flexible strip and the optical fiber are secured to the surface to form the optical cable.

24. A tool as defined in claim 23 wherein said unrolling means comprises a drive wheel which rolls on said surface and an idler wheel in edge contact with said drive wheel and said first reel means.

25. A tool as defined in claim 24 further including means for pressing said flexible strip against the surface as it is unrolled from the second reel means.

26. A tool as defined in claim 25 wherein said first reel means includes means for holding a rolled length of at lease one protective strand.

* * * * *